(12) United States Patent
Gaenger et al.

(10) Patent No.: US 8,326,320 B2
(45) Date of Patent: Dec. 4, 2012

(54) METHOD AND LOCATING DEVICE FOR LOCATING AT LEAST ONE MOBILE RADIO SUBSCRIBER

(75) Inventors: Karsten Gaenger, Berlin (DE); Jens Plogsties, Berlin (DE); Ralf Kreher, Berlin (DE); Armin Klopfer, Dallgow (DE)

(73) Assignee: Tektronix, Inc., Beaverton, OR (US)

( * ) Notice: Subject to any disclaimer, the term of this patent is extended or adjusted under 35 U.S.C. 154(b) by 532 days.

(21) Appl. No.: 12/548,369

(22) Filed: Aug. 26, 2009

(65) Prior Publication Data

US 2010/0056179 A1    Mar. 4, 2010

(30) Foreign Application Priority Data

Aug. 28, 2008 (EP) .................... 08163174

(51) Int. Cl.
  *H04W 24/00* (2009.01)
  *G01S 13/08* (2006.01)
(52) U.S. Cl. .............. 455/456.1; 342/118; 342/125; 342/126
(58) Field of Classification Search ............... 455/456.1
  See application file for complete search history.

(56) References Cited

U.S. PATENT DOCUMENTS

| | | | |
|---|---|---|---|
| 6,952,471 B1* | 10/2005 | Cannon et al. | 379/390.01 |
| 7,519,372 B2 | 4/2009 | MacDonald et al. | |
| 2002/0025822 A1 | 2/2002 | Hunzinger | |
| 2005/0012656 A1* | 1/2005 | Reisman et al. | 342/118 |
| 2007/0127558 A1* | 6/2007 | Banister | 375/148 |
| 2008/0039114 A1 | 2/2008 | Phatak et al. | |
| 2009/0221299 A1 | 9/2009 | MacDonald et al. | |

FOREIGN PATENT DOCUMENTS

| | | |
|---|---|---|
| EP | 0 800 319 A1 | 10/1997 |
| EP | 2 160 065 A1 | 3/2010 |
| WO | WO 02/082832 A2 | 10/2002 |

OTHER PUBLICATIONS

European Patent Office; Search Report for EPO Application No. 08 163 174.9 (German Text); Dec. 13, 2010; (6 pages).
European Patent Office; English Translation of Search Report for EPO Application No. 08 163 174.9; Dec. 13, 2010; (4 pages).
Mouly, M. et al.; "Radio Resource Management;" "GSM System for Mobile Communications;" Jan. 1, 1993; pp. 380-430; Lassay-Les-Chateaux, Europe Media, France (EPO document No. XP000860006).

* cited by examiner

*Primary Examiner* — Charles Appiah
*Assistant Examiner* — Natasha Cosme
(74) *Attorney, Agent, or Firm* — Fogarty, L.L.C.

(57) ABSTRACT

The present invention relates to a method for locating at least one mobile radio subscriber in a mobile radio network, wherein to each transmitting station a value correlated with the receive field strength of a signal from this transmitting station is allocated; including the following steps: a) from the information determined upon connection setup, a table is created per cell, in which at least one distance parameter to the transmitting station of the cell is allocated to the respective receive field strengths; b) for at least one value correlated with the receive field strength and transmitted in the measurement report, the allocated distance parameter to the transmitting station of the respective cell is read out from the table created in step a); and c) determining at least one point satisfying the distance parameter(s) read-out in step b).

12 Claims, 4 Drawing Sheets

| Cell | Receive field strength | Distance |
|---|---|---|
| BS1, CellID1 | -87 dBm | 520m |
| | -70 dBm | 150m, 300m |
| | -105 dBm | 2000m |
| | ⋮ | ⋮ |
| BS1, CellID2 | ⋮ | ⋮ |
| BS1, CellID3 | ⋮ | ⋮ |
| BS2, CellID1 | -88 dBm | 600m |
| | ⋮ | ⋮ |
| BS3, CellID2 | -75 dBm | 250m |
| | ⋮ | ⋮ |

Fig.1

Measurement Report
MFT X, $t_1$ ⟶ BS1, CellID1

| | | |
|---|---|---|
| BS1, CellID1 | -87 dBm ⇒ 520m | from BS1, CellID1 |
| BS2, CellID1 | -88 dBm ⇒ 600m | from BS2, CellID1 |
| ⋮ | ⋮ | |

(Allocation of values from Fig. 1)

Fig.2

| Measurement Report | |
|---|---|
| MFT X, $t_2$ → BS2, CellID1 | |
| BS2, CellID1 | −88 dBm |
| BS1, CellID1 | −70 dBm |
| BS3, CellID2 | −75 dBm |
| ⋮ | ⋮ |

⇒ 600m from BS2, CellID1

⇒ 150m, 300m from BS1, CellID1

⇒ 250m from BS3, CellID2

(Allocation of values from Fig. 1)

METHOD AND LOCATING DEVICE FOR LOCATING AT LEAST ONE MOBILE RADIO SUBSCRIBER

CROSS-REFERENCE TO RELATED APPLICATIONS

The present application claims the benefit of the filing date of European patent application serial no. 08163174.9, filed Aug. 28, 2008, the disclosure of which is hereby incorporated by reference herein in its entirety.

SUMMARY OF THE INVENTION

The present invention relates to a method for locating at least one mobile radio subscriber in a mobile radio network, wherein the mobile radio network includes at least the following characteristics: the smallest addressable unit is a cell, wherein a transmitting station is associated with each cell; at least upon connection setup, information about the receive field strength and a parameter correlated with the distance of the mobile radio subscriber to the transmitting station of the active cell are determined; with and/or without active mobile radio link, a mobile radio subscriber transmits at least once a measurement report, wherein an itemization is provided in the measurement report, which includes at least two transmitting stations, wherein to each transmitting station a value correlated with the receive field strength of a signal from this transmitting station is allocated. Moreover, it relates to a corresponding locating device as well as a computer program product for performing a method according to the invention.

In the following, the smallest addressable unit is referred to as a cell independently of the allocation of this term in the mobile radio domain. For example, in an UMTS network, the complete radiation environment, i.e. 360°, of a base station referred to as NodeB there, is divided in up to six separated regions. A certain identification is allocated to each one of these regions such that each one of these regions is to be comprehended as the smallest addressable unit, i.e. cell, within the meaning of the following explanations, although the transmitting station allocated to each region is the same. The corresponding applies to other network standards, for example a GSM network.

The location of mobile radio subscribers with high accuracy is of high importance for various reasons. Mobile radio subscribers move almost uncorrelated in the area, while services of a mobile radio provider can be used. If a problem with the link, for example a call termination, occurs, thus, it is extraordinarily important for the provider to localize the location at which the problem has occurred. For example, such problems are embraced by the term coverage problems.

An approach known from the prior art provides to read out indications about the cell, in which the mobile radio subscriber is located, from protocol messages. Thus, the location of the mobile radio subscriber can be determined relatively inexactly to cell lighting size via an external database, in which the coordinates of the cells are registered.

Higher accuracy can be achieved by drive tests, in which a mobile radio apparatus coupled to a GPS apparatus is carried along in a vehicle. However, such drive tests are time consuming and thus costly. However, this only concerns the location of test mobile radio apparatuses during the test drives. The localization of real users in the network, which do not carry a GPS apparatus with them, is not allowed thereby.

Therefore, the object of the present invention is to provide a method for locating, a locating device as well as a corresponding computer program product for performing the method, which allows locating the mobile radio subscriber as exactly as possible with low effort.

This object is solved by a method having the features of claim 1 and a locating device having the features of claim 10.

The present invention is based on the realization that location of the mobile radio subscriber without drive tests and without dedicated measurement apparatuses is possible by clever evaluation of information that is transmitted in the network anyway. For this, a table is created from the information per cell determined upon connection setup, in which at least one distance parameter to the transmitting station of the cell is allocated to the respective receive field strengths. Subsequently, the allocated distance parameter to the transmitting station of the respective cell is read out from at least one value from the table correlated with the receive field strength and transmitted in the measurement report, and finally, the point is determined, which satisfies the read-out distance parameter(s).

Depending on how many distance parameters are linked therein, the location of the mobile radio subscriber can be determined very exactly. The location can be made both in an active state, i.e. there exists an active mobile link of speech, data or control data, and in an idle state, thus without active mobile radio link. Moreover, the location is not only possible at a certain point in time, for example at the beginning of the call, but at arbitrary points in time. The present invention relies on the approach known from the prior art, which allows determination of the location of the mobile radio subscriber to cell lighting size. However, it uses further parameters for exact localization and takes into account the specific field propagation conditions in the various cells by new correlation of pairs of values with each cell.

Since the topology and, by the specific development, the field propagation conditions vary from cell to cell, a data base is created for each cell from receive parameters and reported distance parameters, for example TA (Timing Advance in the GSM standard or Propagation Delay in the UMTS standard). The method uses an algorithm, which is now capable of providing statistically probable pairs of values for each cell. By consideration of data also collected from the neighbor cells, correct pairs can be found and false ones can be excluded. For example, this can be performed by triangulation.

By this approach, the distance of the mobile radio subscriber can be concluded from a passively measured field strength, for example from received messages from the mobile radio subscriber. Location determination is possible preferably by subsequent triangulation of also collected data from the neighbor cells. By further interpolation and extrapolation of measurement values discrete in time, continuous location can be allowed. A representative result is possible for very different development by the specific passive measurement of each cell, i.e. a learn phase.

While an accuracy for a "cake slice" within a cell for example having a width of 210 m (±105 m) in the UMTS standard can be achieved upon evaluation of at least one distance parameter—which is already an appreciable improvement over the prior art—even more exact results can be achieved if the distance parameters to at least two transmitting stations are read out and used for determining the location. Particularly advantageously, therein, an opening angle of a transmitting station of a cell can also be taken into account. Thereby, incorrectly determined points can be excluded: namely, if two distance parameters are evaluated, due to the two circles around the respective transmitting station of the cell, two points of intersection result. If one is outside of the opening angle coming into consideration of one of the two cells, this point can be excluded and therefore the other point can be determined as the correct one.

Since the events, at which location of the mobile radio subscriber is particularly desired, do not necessarily coincide with the times of transmitting a measurement report, the location at which the mobile radio subscriber has been located at the time of this event, can be particularly cleverly determined by interpolation. For this, the receive field strength and/or the distance parameter to the at least one transmitting station is determined by interpolation for the point in time and at least one transmitting station. Various linear or non-linear methods can apply to the interpolation.

If, for example, the special event is a connection abort, thus, based on the distance parameters having been determined by way of the last transmitted measurement report, the distance parameter to at least one transmitting station, preferably to at least two transmitting stations, can be determined for the time of connection abort by extrapolation. Various linear or non-linear algorithms can also be used for this.

Preferably, the measurement report is continuously transmitted, for example regularly every 100 ms to 10 s, or related to event, especially upon change of the transmitting station received with the greatest receive field strength. Thereby, very exact location of the mobile radio subscriber can still be made with low bandwidth. For special problem cases, the rate, with which the measurement report is transmitted, can be temporarily increased by intervention in the protocol of the air interface in order to allow very exact location.

Preferably, the distance parameter is determined from the Timing Advance Parameter of a G2 mobile radio network or from the Propagation Delay Parameter of a G3 network or corresponds thereto. With the Propagation Delay Parameter, 1 bit corresponds to 78 m such that the resolution of the distance is ±39 m in the 10 ideal case. In some cases, an accuracy of min. 3 bit is reported, which corresponds to an accuracy of ±117 m anyway.

The table can be created for different mobile radio apparatuses, particularly different types of mobile radio apparatuses, wherein reading-out and/or determining the location of the mobile radio subscriber is effected specific to mobile radio apparatus. The table can be obtained by means of test drives. In contrast to the prior art, for this, conventional mobile radio apparatuses without GPS apparatus can be used. Thereby, the quality, i.e. the resolution of the table, can be appreciably improved.

The preferred embodiments presented with respect to the method according to the invention and the advantages thereof apply correspondingly, if applicable, to a locating device according to the invention as well as to a computer program product according to the invention.

A preferred development of a locating device according to the invention includes at least one storage device for creating the table. Preferably, a locating device according to the invention further includes a display device, wherein the locating device is configured to display the local coordinates of the determined point. Particularly preferably, it is configured to display a map with the determined point and the receivable transmitting stations. Thereby, a user is allowed to particularly quickly and reliably recognize the determined location and environment thereof.

Further preferred embodiments are apparent from the dependent claims.

BRIEF DESCRIPTION OF THE DRAWINGS

In the following, embodiments of the method according to the invention are now described in more detail with reference to the attached drawings, which show:

FIG. 1 is a schematic representation of a table, in which distances are allocated to the receive field strengths for different cells;

FIG. 2 is a schematic representation of a first measurement report that the mobile radio subscriber X transmits to the active cell at the time $t_1$, as well as the distance parameters to exemplarily two transmitting stations determined with application of table 1;

DETAILED DESCRIPTION OF THE INVENTION

FIG. 1 shows a table in which pairs of values are stored for each cell, wherein each pair of values reproduces a receive field strength upon connection setup and the distance parameter transmitted thereto. Actually, for better understanding, the distance parameter is converted into a distance of the mobile radio subscriber to the transmitting station of the corresponding cell. In a GSM network, the distance parameter is the Timing Advance Parameter, while in an UMTS network, the distance parameter is the Propagation Delay Parameter. The invention is of course applicable to other network standards, if there are parameters transmitted from which the distance between mobile radio subscriber and active transmitting station can be determined.

Preferably, this table is created in a locating device according to the invention, which is connected to the outermost node in the network before the air interface for passive monitoring of the measurement reports, for example in a base station in a GSM network or the NodeB of an UMTS network. However, the locating device can also be connected to a network element higher in hierarchy.

As is apparent from the table, two distances come into consideration for a receive field strength of −70 dBm of the cell BS1, Cell ID1, namely 150 m and 300 m.

FIG. 2 first exemplarily shows a measurement report, a so-called measurement report that the mobile radio subscriber (MFT) X transmits to the active cell, actually BS1, Cell ID1, at the time $t_1$. This measurement report includes, preferably organized according to receive field strengths, the receive field strengths of a reference signal, for example the CPiCh (=Common Pilot Channel) signal radiated from the transmitting stations with constant power, of all of the receivable transmitting stations. Accordingly, the transmitting station BS1, Cell ID1, is received with −87 dBm, the BS2, Cell ID1, with −88 dBm. Now, if one looks up the corresponding receive field strengths for the respective transmitting station in the table of FIG. 1, thus, it reveals that the mobile radio subscriber X was 520 m apart from the transmitting station of the cell BS1, Cell ID1, at the time $t_1$, 600 m apart from the transmitting station of the cell BS2, Cell ID1.

Figures 3, 4:
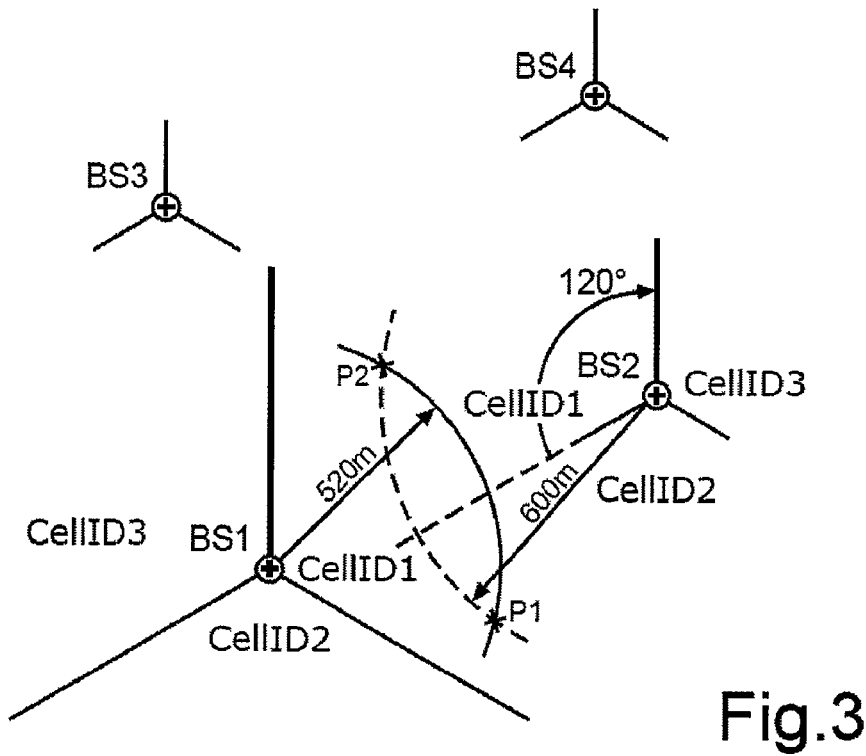
FIG. 3 is a first location example in which two distance parameters as well as an opening angle are used for determining the location of the mobile radio subscriber for the measurement report of FIG. 2.
FIG. 4 is a schematic representation of a second measurement report that the mobile radio subscriber X transmits to the active cell at the time $t_2$, as well as the distance parameters to exemplarily three transmitting stations determined with application of table 1.

FIG. 3 shows a map in which, first, four base stations BS1 to BS4 are registered. Actually, each base station has three cells exemplarily referred to as Cell ID1 to Cell ID3. Therefore, each Cell ID has an opening angle of 120° starting from the transmitting station arranged in the associated base station. Actually, the transmitting station of each Cell ID is arranged in the associated base station.

If one now enters the values determined according to FIG. 2 into the map of FIG. 3, thus, a circle with a radius of 520 m around the base station BS1 and a circle with a radius of 600 m around the base station BS2 result. The two circles intersect in the points P1 and P2. First, these two points P1, P2 come into consideration as the location for the mobile radio subscriber X at the time $t_1$. If one now additionally considers the opening angle of the cell BS2, Cell ID1, thus, the point P1 can be excluded. Accordingly, the actual location of the mobile radio subscriber X at the time $t_1$ was the point P2.

FIG. 4 shows a second measurement report for the mobile radio subscriber X at the time $t_2$ that it transmits to the active cell BS2, Cell ID1. By looking-up in the table of FIG. 1, a distance of the mobile radio subscriber X from the transmitting station of the cell BS2, Cell ID1, of 600 m at the time $t_2$, from the transmitting station of the cell BS1, Cell ID1, of 150 m or 300 m and from the transmitting station of the Cell BS3, Cell ID2 of 250 m result.

Figure 5:
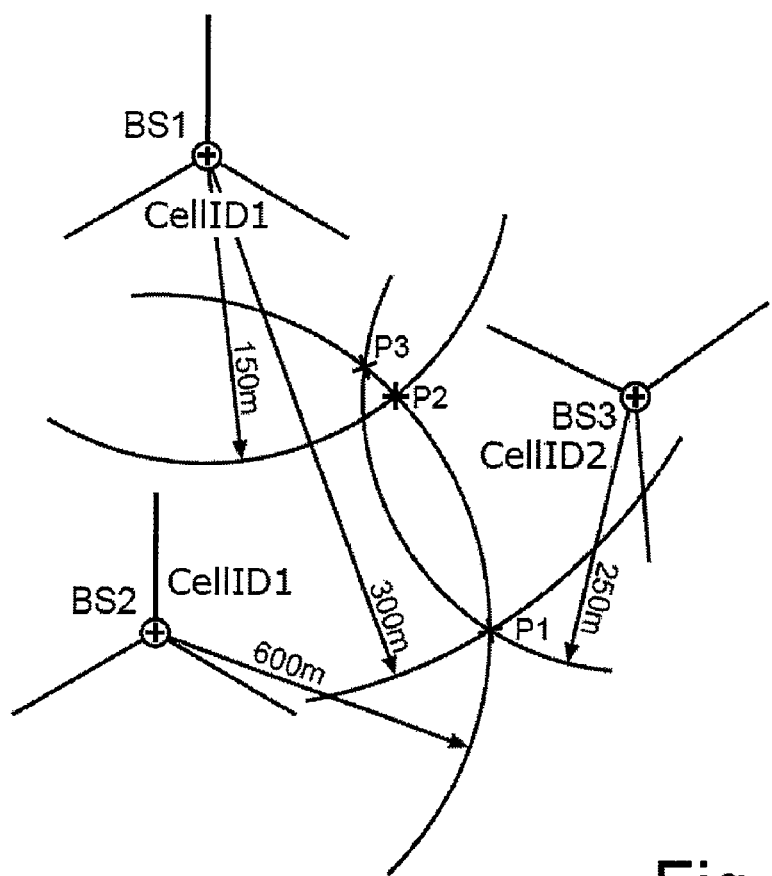
FIG. 5 is a second location example in which four distance parameters are used for determining the location of the mobile radio subscriber for the measurement report of FIG. 4.

FIG. 5 shows the constellation resulting for this example. If one first evaluates the distances from the transmitting station of the cell BS2, Cell ID1, and BS1, Cell ID1, thus, two possible points P1 and P2 result. In contrast, if one additionally evaluates the distance of the mobile radio subscriber from the transmitting station of the cell BS3, Cell ID2, thus, another point of intersection P3 results, whereas in the point P1 all of the three distance conditions are satisfied. Accordingly, the point P1 is the location of the mobile radio subscriber X at the time $t_2$.

Figure 6:
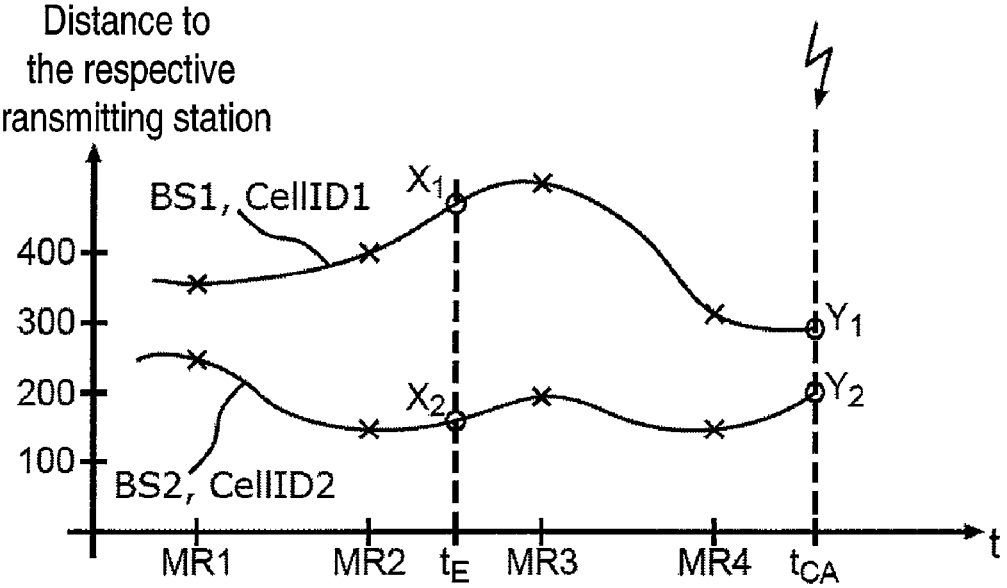
FIG. 6 is an example of the determination of the location of the mobile radio subscriber at the time $t_E$ by interpolation and at the time $t_{CA}$ by extrapolation, respectively.

FIG. 6 exemplarily shows the time course of the distances of the mobile radio subscriber X to the transmitting station of the cell BS1, Cell ID1, as well as the transmitting station of the cell BS2, Cell ID2. First, the points resulting due to the information transmitted in the measurement reports are registered, which are identified by small crosses. By interpolation, the distances can also be determined for times, which are between the times at which the measurement reports are transmitted. Thus, the location of the mobile radio subscriber X can thereby be determined by interpolation of the distances with high accuracy at the time $t_E$ at which a certain event has occurred. Accordingly, the mobile radio subscriber X was $X_1$ m apart from the transmitting station of the cell BS1, Cell ID1, at the time $t_E$, $X_2$ m apart from the transmitting station of the cell BS2, Cell ID2. Upon call abort, interpolation is not available. The distances at the time $t_{CA}$ of the call abort are actually determined by extrapolation. Accordingly, the mobile radio subscriber X was $Y_1$ m apart from the transmitting station of the cell BS1, Cell ID1, at the time $t_{CA}$, $Y_2$ m apart from the transmitting station of the cell BS2, Cell ID2. Of course, in this approach, the distances to further transmitting stations can be determined and taken into account in the determination of the location.

Figure 7:
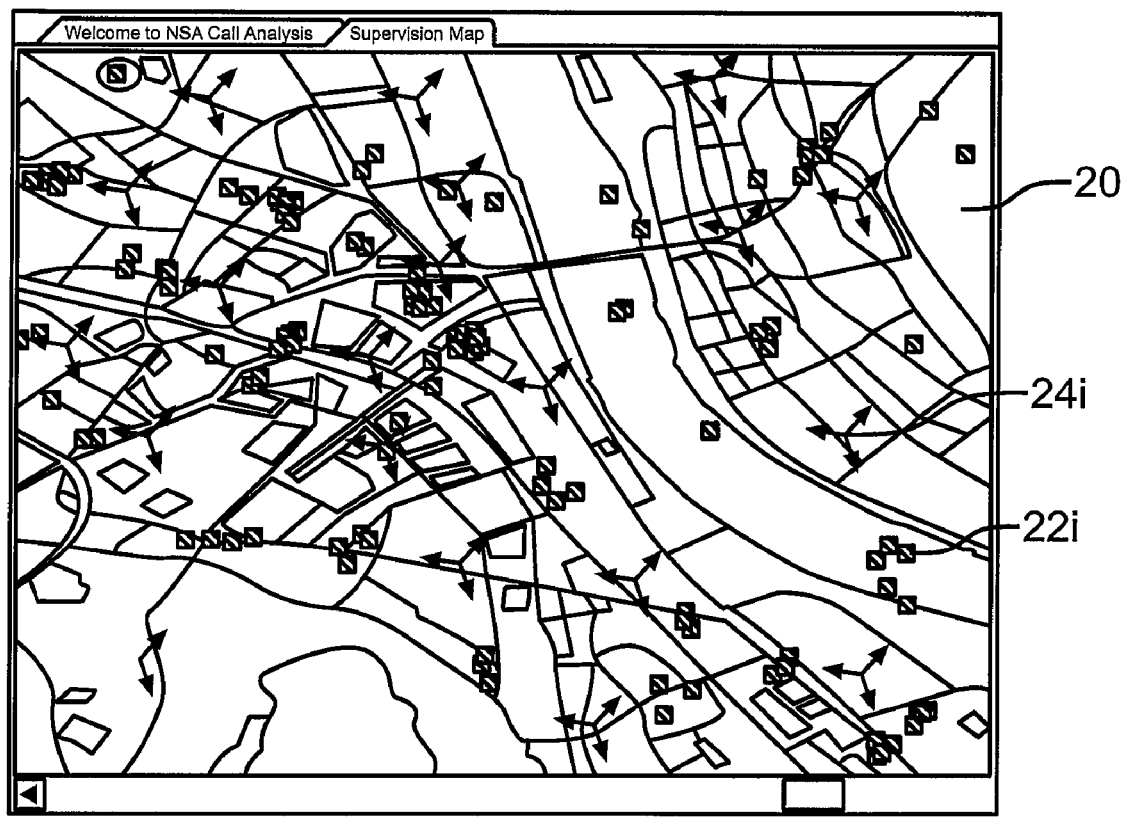
FIG. 7 is a screen shot of localized mobile radio subscribers and base stations.

FIG. 7 shows a screen shot of a display device 20 of a locating device according to the invention, on which a map is depicted, wherein the located mobile radio subscribers (the small drawn-in squares 22$i$) as well as the base stations 24$i$ disposed in the depicted geographic area and the cells resulting from that are registered in this map taking into account their actual opening angles. If one moves on one of these squares 22$i$ or on one of these registered base stations 24$i$ with the cursor, respectively, thus, further information to the mobile radio subscriber (particularly to his identification with indications to his link etc.) to the corresponding mobile radio link or the corresponding base station, respectively, are displayed in a pop-up window.

The table of FIG. 1 can be filled with further entries by drive tests in order to allow an even finer screening and thus an even finer location of the mobile radio subscriber, if required. As already mentioned, a measurement device according to the invention is preferably disposed on the IuB interface of a mobile radio network according to the UMTS standard.

The invention claimed is:

1. A method for locating at least one mobile radio subscriber in a mobile radio network, wherein the mobile radio network includes at least the following characteristics:
   the smallest addressable unit is a cell, wherein a transmitting station is associated with each cell;
   at least upon connection setup, information about the receive field strength and a parameter correlated with the distance of the mobile radio subscriber to the transmitting station of the active cell is determined;
   with and/or without active mobile radio link, a mobile radio subscriber transmits at least once a measurement report, wherein an itemization is provided in the measurement report, which includes at least two transmitting stations, wherein to each transmitting station a value correlated with the receive field strength of a signal from this transmitting station is allocated;
   the method comprising:
     creating a table per cell based at least in part upon the determined information and in which at least one distance parameter to the transmitting station of the cell is allocated to the respective receive field strengths;
     for at least one value correlated with the receive field strength and transmitted in the measurement report, reading out, from the table, the allocated distance parameter to the transmitting station of the respective cell;
     determining at least one point satisfying the distance parameter(s), wherein after a connection abort, based on distance parameters determined from a last transmitted measurement report, the allocated distance parameters to at least two transmitting stations are determined for the time ($t_{CA}$) of the connection abort by extrapolation.

2. The method of claim 1, wherein determining the at least one point includes taking into account at least one opening angle of a transmitting station of a cell.

3. The method of claim 1, wherein determining the at least one point includes reading out distance parameters to at least two transmitting stations.

4. The method of claim 1, further comprising:
   between the times at which measurement reports are transmitted, determining, by interpolation, for at least one further time ($t_E$) and at least one transmitting station, the receive field strength and/or the distance parameter to the at least one transmitting station.

5. The method of claim 1, further comprising:
   receiving the measurement report every 100 ms to 10 s, or related to an event including a change of the transmitting station received with the greatest receive field strength.

6. The method of claim 1, wherein the distance parameter is determined from the Timing Advance Parameter of a G2 mobile radio network or from the Propagation Delay Parameter of a G3 network or corresponds thereto.

7. The method of claim 1, wherein the table is created for different mobile radio apparatuses and the reading-out and the determining are effected specifically to a given mobile radio apparatus.

8. The method of claim 1, wherein the table is obtained with test drives.

9. A locating device for locating at least one mobile radio subscriber in a mobile radio network, in which the smallest addressable unit is a cell, wherein a transmitting station is associated with each cell; in which at least upon connection setup, information about the receive field strength and a parameter correlated with the distance of the mobile radio subscriber to the transmitting station of the active cell is determined; in which with and/or without active mobile radio link, a mobile radio subscriber transmits at least once a measurement report, wherein an itemization is provided in the measurement report, which includes at least two transmitting stations, wherein to each transmitting station a value correlated with the receive field strength of a signal from this transmitting station is allocated; the locating device being configured to:

create a table per cell from the information determined upon connection setup, in which at least one distance parameter to the transmitting station of the cell is allocated to the respective receive field strengths;

for at least one value correlated with the receive field strength and transmitted in the measurement report, to read out the allocated distance parameter to the transmitting station of the respective cell from the table; and determine at least one point satisfying the distance parameter(s) wherein after a connection abort, based on distance parameters determined from a last transmitted measurement report, the allocated distance parameters to at least two transmitting stations are determined for the time ($t_{CA}$) of the connection abort by extrapolation.

10. The locating device of claim 9, further comprising:

at least one storage device for creating the table.

11. The locating device of claim 9, further comprising:

a display device, wherein the locating device is configured to display the local coordinates of the determined point.

12. The locating device of claim 11, further configured to display a map with the determined point and the receivable transmitting stations.

* * * * *